(No Model.)
J. WHATLEY.
LATHE TOOL.
No. 398,918. Patented Mar. 5, 1889.
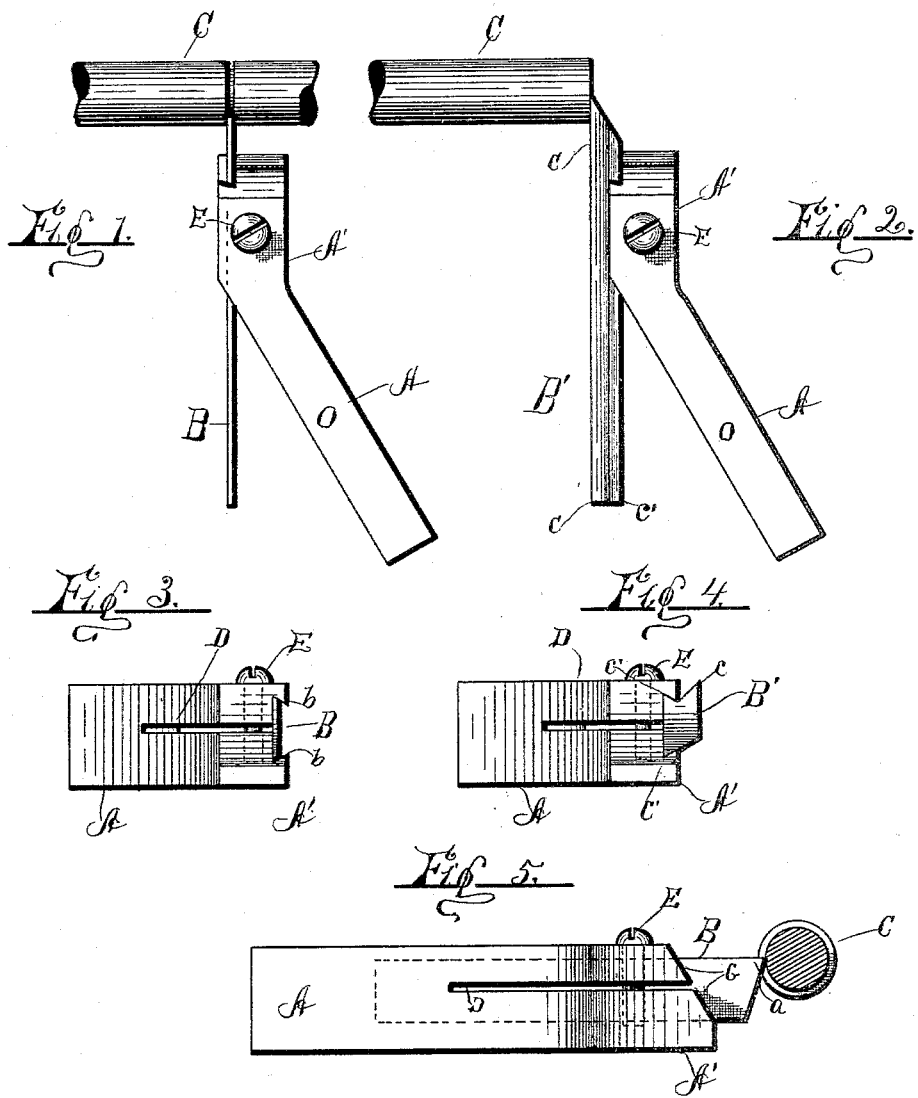
WITNESSES:
C. E. Tomlinson.
H. W. Tyler.
INVENTOR,
John Whatley
BY
F. H. Gibbs
ATTORNEY.

UNITED STATES PATENT OFFICE.

JOHN WHATLEY, OF SYRACUSE, NEW YORK.

LATHE-TOOL.

SPECIFICATION forming part of Letters Patent No. 398,918, dated March 5, 1889.

Application filed October 4, 1888. Serial No. 287,235. (No model.)

*To all whom it may concern:*

Be it known that I, JOHN WHATLEY, of Syracuse, in the county of Onondaga, in the State of New York, have invented new and useful Improvements in Lathe-Tools, of which the following, taken in connection with the accompanying drawings, is a full, clear, and exact description.

This invention relates to lathe-tool holders and the blades therefor; and it consists in certain peculiarities in the detail construction of the same, all as hereinafter set forth, and particularly pointed out in the claims.

In the annexed drawings like letters of reference indicate corresponding parts in all the views, in which—

Figure 1 represents my improved tool-holder in use as a cutting-off tool, the blade B being a straight-edged hardened-steel blade, slightly pointed at the forward or cutting end, a. Fig. 2 is a similar view showing another form of blade B, used for trimming and facing the end of shafting, &c. Fig. 3 shows the tool-holder and blade of Fig. 1, looking at it from the forward or cutting end. Fig. 4 is a view similar to Fig. 3, showing the blade of Fig. 2; and Fig. 5 is a side view of Fig. 1, showing the cutting end of the blade projecting as in operation, and showing the slot D and screw E, as hereinafter explained.

By means of my improved tool holder and blade I am readily enabled to do work at a lathe with a light or heavy blade inserted in the holder that has heretofore been extremely difficult, if not impossible, to accomplish.

The shank A of my tool-holder is provided with the bend or offset portion A', into which the blades B and B' are inserted into the dovetail channel or depression b b.

The offset A' and a portion of the shank A are provided with a continuous slot, D, passing laterally through the body of the tool-holder and extending quite to the forward end thereof, so that when a blade, B B', is slipped into the dovetail channel b b and the binding-screw E is tightened the blade is held firmly in position by a sidewise pressure, which greatly stiffens the blade at the cutting end thereof, and when the shank A is inserted in the tool-post of a lathe the binding-screw of said post presses down on the shank at about O, thus increasing the pressure exerted to hold said blade in place and preventing any accidental release of the same.

By means of the offset A' several advantages accrue from the use of my improvement, among which may be mentioned the ease with which the blades may be inserted, adjusted longitudinally, and inspected while in operation; and, again, it has been found in practice that the straight tools heretofore used could not be brought close enough to the point where they are desired to operate on small or close work, owing to the fact that the tool-post of the lathe and the connections thereof in a large number of lathes as at present constructed prevent the cutting-tool being advanced far enough up to the chuck in which the material to be operated on is held, owing to the projecting jaws of the chuck and the supports for the tool-post being in the way of the successful operation of the ordinary tool now in use in small work.

By means of my improvement the shank A may be secured in the tool-post and set at an angle to the work, so that the main portion thereof is out of the way of the chuck, &c., and the offset A', with the blade secured therein, will occupy but a small space in the immediate vicinity of the work, thus allowing a clear space in which to revolve the chuck holding the material to be operated upon.

It is apparent that by inserting a blade with the proper cutting-point my improvement may be used in cutting threads on pipes or shafting, and will run the thread as far as the gripping portion of the chuck-jaws without danger of breaking either the tool-holder or chuck. After a piece of metal has been removed by means of a blade like the blade of Figs. 1, 3, and 5, it is often found that there is a portion of the end which requires additional trimmings or dressing, so as to make the same perfectly smooth, and in such cases the blade B' (illustrated at Figs. 2 and 4) may be inserted in the tool-holding shank, and when advanced to the work the beveled edge C will cut the end of the shaft and put a smooth and fine finish on the same without extra grinding or polishing. The dovetail groove b b is sufficient to hold a thin blade in position when cutting; but when the blade B' with the beveled edge is used said blade is formed in cross-section, as illustrated at Fig. 4, and is provided with the shoulders *c' c'*, which fit closely in the dovetail *b b*, and when the shank is secured in the tool-post said blade is firmly held against longitudinal as well as lateral displacement when pressure is exerted against said beveled edge C in cutting.

It is apparent that one of the advantages secured by using the offset A' is that the rear portion of the blade projecting beyond the same may be adjusted, as it is worn away in use, by simply loosening the set-screw E and adjusting the blade to the required position by light blows of a hammer; or it may be done with the fingers, if desired. The forward end of the offset portion A' is cut away at the upper corner, leaving the face beveled, so as not to interfere with the proper working of the cutting-blade.

Having described my invention, what I claim as new is—

1. In a lathe-tool, the shank A, offset A', slot D, binding-screw E, dovetail channel *b*, and blade B', provided with the shoulders *c' c'*, held in said channel *b b* by means of the binding-screw E, all constructed and operating substantially as and for the purpose set forth.

2. In a lathe-tool, the shank A, provided with the offset A', blade-holding channel *b b*, slot D, and binding-screw E, in combination with the blade B', held in said channel *b b* by means of the shoulders *c' c'* thereon and having the beveled cutting-edge *c* projecting laterally from the main portion thereof, all constructed and operating substantially as and for the purpose set forth and shown.

3. In a lathe-tool, a bent holding-shank provided, respectively, with a shank, A, and offset A', slot D, dovetail blade-holding channel *b b*, binding-screw E, and beveled edge G, in combination with a cutting-blade provided with dovetail shoulders corresponding to the channel *b b* and adapted to be adjustably held therein, all constructed and combined substantially as specified and shown.

In testimony whereof I have hereunto signed my name, in the presence of two attesting witnesses, at Syracuse, in the county of Onondaga, in the State of New York, this 19th day of September, 1888.

JOHN WHATLEY.

Witnesses:
FREDERICK H. GIBBS,
H. W. TYLER.